March 18, 1924.     E. R. DINGEL     1,487,092
GAUGE
Filed Dec. 13, 1922
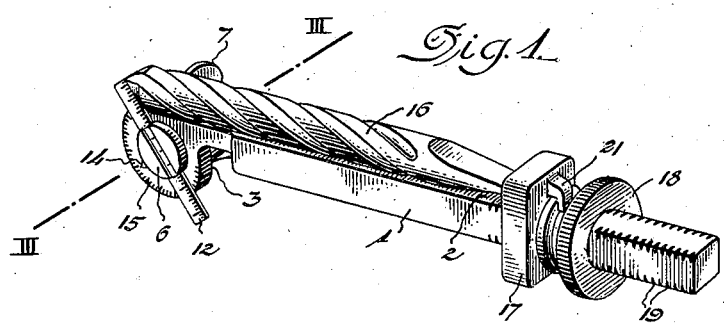
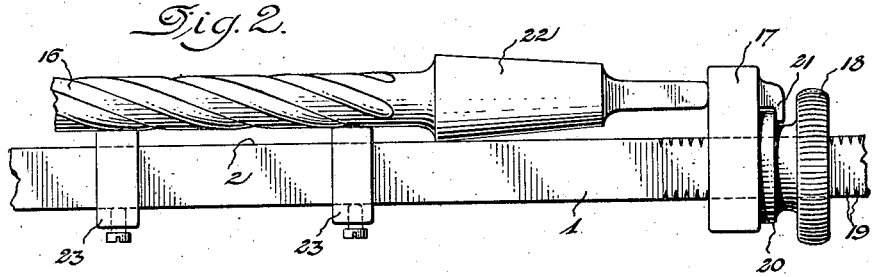
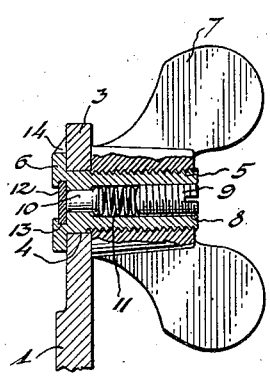
Inventor:
Edward R. Dingel
By
Attorneys Patented Mar. 18, 1924.

1,487,092

UNITED STATES PATENT OFFICE.

EDWARD R. DINGEL, OF DETROIT, MICHIGAN.

GAUGE.

Application filed December 13, 1922. Serial No. 606,591.

*To all whom it may concern:*

Be it known that I, EDWARD R. DINGEL, a citizen of the United States of America, residing at Detroit, in the county of Wayne and State of Michigan, have invented certain new and useful Improvements in Gauges, of which the following is a specification, reference being had therein to the accompanying drawings.

This invention relates to gauges and more particularly to gauges for use in grinding drills or reamers.

The principal object of my invention is to provide a simple and inexpensive form of gauge by which the angle at which the end of the drill is to be ground may readily be indicated and by which the position of the central axis of the drill may readily be determined.

In the drawings forming a part of the specification,

Figure 1 is a perspective view of a familiar form of twist drill in position upon a gauge constituting a preferred embodiment of my invention;

Fig. 2 is a side elevation of a portion of a drill of a different configuration from that shown in Fig. 1 together with a fragment of a gauge having attachments adapting it for use with the form of drill illustrated, and Fig. 3 is a fragmentary section through the gauge on the line III—III of Fig. 1.

The gauge consists essentially of a shank 1 preferably having at least one flat face 2 for contact with the tool with which the gauge is to be used, one end of the shank being enlarged to form a disk-like member 3 provided with a perforation 4 lying at one side of the face 2. Mounted for rotation within the perforation 4 is a member 5 having a head 6 adapted for engagement with one face of the member 3 and screwthreaded upon the portion which projects beyond the opposite face of the member 3 to receive a clamp nut 7 which engages a face of the member 3 to hold the member 5 securely in any desired position of angular adjustment.

The member 5 has a central bore 8, the end of the bore remote from the head 6 being screwthreaded to receive the screw 9 and the opposite end of the bore adjacent to the head 6 being preferably of smaller diameter to receive a slidable pin 10 which preferably has an enlarged head lying within the major portion of the bore 8 to limit the outward movement of the pin 10.

A spring 11 lies between the screw 9 and the head of the pin 10 so that the pin 10 is normally resiliently held in its outermost position with its outer end in engagement with a graduated gauge member 12. This member 12 preferably consists of a flat strip of metal graduated along one edge and the head 6 of the member 5 is provided with an undercut channel 13 extending transversely of the head and across the axis thereof, the channel being of a size to permit easy sliding movement of the gauge member 12 which is held therein by the spring pressed pin 10. On one side of the head 6 is formed a pointer 14, the outer end of which lies adjacent to a graduated arc 15 formed upon the face of the member 3.

It will be seen that the member 12 may be slid longitudinally of the channel 13 so that its outer end will project beyond the face 2 of the shank 1 to a point in line with the axis of the drill 16 which lies in engagement with the face 2. The gauge member 12 may be adjusted at any desired angle to the face 2 by rotating the member 5 within the member 3, while the nut 7 is loose enough to permit such angular movement, and when the gauge member 12 has been placed at the desired angle, the nut 7 will be tightened to prevent rotation of the member 5.

A slidable block 17 having a non-circular opening adapted to have a sliding fit upon the shank 1 acts as an abutment for the rear end of the drill 16 so that its point will be held at any adjusted position longitudinally of the shank 1. As a ready means for adjusting the block 17 lengthwise of the shank 1, a thumb nut 18 engages the screwthreaded portions 19 on the rear end of the shank 1, this nut having an annular flange 20 for engagement with an overhanging lip 21 upon the block 17.

It is evident that rotation of the thumb nut 18 will cause longitudinal movement of the block 17 upon the shank 1. For adjustment of the block to accommodate drills of different lengths for drills having a tapered tang such as indicated at 22 in Fig. 2, additional sliding blocks 23 will be mounted upon the shank 1 having flat faces for engagement with the cylindrical portion of the drill, the faces of the blocks 23 being at a sufficient distance from the face 2 of the shank to accommodate the projecting portion 22 of the drill.

It will be obvious that many modifications will be made in the details of construction of the device herein described, without departing from the principles thereof or sacrificing any of its advantages. I therefore desire to claim the invention broadly within the valid and legitimate scope of the appended claim.

I claim:—

A gauge comprising a shank having a gauge face, said shank having an opening therethrough near one end, a rotatable member mounted for rotation in said opening, said member having a head at one end engaging one face of the shank and having its other end threaded, a nut on the threaded end of said member whereby the rotatable member may be held in any desired position of angular adjustment, said head having a channel formed therein, a gauge member longitudinally slidable within said channel, and a spring-pressed pin in said rotatable member engaging the gauge member within said channel to hold the member at any desired position of longitudinal adjustment.

In testimony whereof I affix my signature in presence of two witnesses.

EDWARD R. DINGEL.

Witnesses:
ARTHUR MINNICK,
ANNA M. DORR.